United States Patent
Lepczyk et al.

(10) Patent No.: US 10,052,951 B2
(45) Date of Patent: Aug. 21, 2018

(54) ACTIVE ACCELERATOR PEDAL FOR A VEHICLE

(71) Applicant: Audi AG, Ingolstadt (DE)

(72) Inventors: Daniel Lepczyk, Schrobenhausen (DE); Jan Oberthür, Ingolstadt (DE)

(73) Assignee: Audi AG, Ingolstadt (DE)

( * ) Notice: Subject to any disclaimer, the term of this patent is extended or adjusted under 35 U.S.C. 154(b) by 233 days.

(21) Appl. No.: 15/183,315

(22) Filed: Jun. 15, 2016

(65) Prior Publication Data
US 2016/0368376 A1 Dec. 22, 2016

(30) Foreign Application Priority Data
Jun. 16, 2015 (DE) .................... 10 2015 007 584

(51) Int. Cl.
| | | |
|---|---|---|
| *G06F 7/70* | (2006.01) | |
| *B60K 26/02* | (2006.01) | |
| *B60W 50/16* | (2012.01) | |
| *G05G 1/44* | (2008.04) | |
| *G05G 5/03* | (2008.04) | |

(52) U.S. Cl.
CPC .......... *B60K 26/021* (2013.01); *B60W 50/16* (2013.01); *G05G 1/44* (2013.01); *G05G 5/03* (2013.01); *B60K 2026/023* (2013.01)

(58) Field of Classification Search
CPC .......... B60K 2026/023; B60K 26/021; B60W 50/16
USPC ...................................... 701/70, 93
See application file for complete search history.

(56) References Cited

U.S. PATENT DOCUMENTS

| | | | |
|---|---|---|---|
| 2011/0130939 A1* | 6/2011 | Hartmann ............ | B60W 10/02 701/93 |
| 2015/0127236 A1* | 5/2015 | Sieber .................. | B60W 50/16 701/70 |
| 2016/0368376 A1* | 12/2016 | Lepczyk ............... | B60W 50/16 |

FOREIGN PATENT DOCUMENTS

| | | |
|---|---|---|
| DE | 10 2004 026 407 | 12/2005 |
| DE | 10 2004 026 409 | 12/2005 |
| DE | 10 2007 011 739 | 9/2008 |
| DE | 10 2010 018 753 | 11/2011 |
| DE | 102011108325 | 2/2012 |
| DE | 102011050056 | 11/2012 |
| DE | 102011088301 | 6/2013 |

(Continued)

OTHER PUBLICATIONS

European Search Report dated Aug. 30, 2016 with respect to counterpart European patent application EP 16 00 1219.

*Primary Examiner* — Redhwan K Mawari
(74) *Attorney, Agent, or Firm* — Henry M. Feiereisen LLC

(57) ABSTRACT

A vehicle includes a drive unit configured to generate a drive torque in driving relationship to wheels of the vehicle, and a gas pedal constructed in the form of an active accelerator pedal which is adjustable over a pedal travel. A control device activates the drive unit in response to a desired torque given by a driver through actuation of the accelerator pedal. Operatively connected to the control device is an actuator which applies a resistance force upon the accelerator pedal, thereby generating a pressure point for the accelerator pedal, with the resistance force increasing in a locally limited pedal travel interval up to a maximum force which can be overridden by the driver. An evaluation unit of the control unit generates a deactivation signal within the pedal travel interval, when the accelerator pedal reaches a predefined limit hold time.

10 Claims, 2 Drawing Sheets

(56) References Cited

FOREIGN PATENT DOCUMENTS

DE 102012209647 12/2013
DE 102012217677 3/2014

* cited by examiner

ACTIVE ACCELERATOR PEDAL FOR A VEHICLE

CROSS-REFERENCES TO RELATED APPLICATIONS

This application claims the priority of German Patent Application, Serial No. 10 2015 007 584.5, filed Jun. 16, 2015, pursuant to 35 U.S.C. 119(a)-(d), the disclosure of which is incorporated herein by reference in its entirety as if fully set forth herein.

BACKGROUND OF THE INVENTION

The present invention relates to an active accelerator pedal for a vehicle.

The following discussion of related art is provided to assist the reader in understanding the advantages of the invention, and is not to be construed as an admission that this related art is prior art to this invention.

Modern motor vehicles are equipped with an active accelerator pedal to provide haptic feedback about the actual travel parameters to the driver. The active accelerator pedal can have an actuator which deliberately applies a resistance force upon the accelerator pedal in opposition to the depression direction of the accelerator pedal. For example, starting from a certain position of the accelerator pedal, the actuator can provide a variable pressure point with which a further depression of the accelerator pedal is impeded, but can be overridden by the driver.

It would be desirable and advantageous to provide an improved active accelerator pedal for a vehicle to obviate prior art shortcomings and to enable a decrease in power consumption during travel in a simple and yet reliable manner.

SUMMARY OF THE INVENTION

According to one aspect of the present invention, a vehicle includes a drive unit configured to generate a drive torque in driving relationship to wheels of the vehicle, a gas pedal constructed in the form of an active accelerator pedal which is adjustable over a pedal travel, a control device configured to activate the drive unit in response to a desired torque given by a driver through actuation of the accelerator pedal, the control device including an evaluation unit, and an actuator operatively connected to the control unit and configured to apply a resistance force upon the accelerator pedal, thereby generating a pressure point for the accelerator pedal, with the resistance force increasing in a locally limited pedal travel interval up to a maximum force which can be overridden by the driver, wherein the evaluation unit is configured to generate a deactivation signal within the pedal travel interval, when the accelerator pedal reaches a predefined limit hold time, to thereby enable a decrease of the resistance force.

The invention is based on the recognition that heretofore the actuator applies a resistance force at all times, even though the driver has no intention to override the pressure point. The present invention resolves prior art problems by incorporating an evaluation unit in the control unit to generate a deactivation signal, starting from a predefined limit hold time of the accelerator pedal, for decreasing the resistance force applied by the actuator. Thus, in accordance with the present invention, when the pressure point has been reached (not exceeded), the resistance force is being reduced after a short time. This reduction in force is generally not noticed by the driver who intends to maintain travel in the depressed pedal position. As the resistance force is removed, there is no need for the actuator to consume much power, as opposed to conventional approaches in which the resistance force is applied as long as the driver exceeds the pressure point or releases the pedal, in which case the pedal is shifted away from the pressure point pedal travel interval. This substantial power consumption can now be avoided with the active accelerator pedal and the intelligent activation system in accordance with the present invention.

According to another advantageous feature of the present invention, the evaluation unit can be configured to ascertain an actual hold time of the accelerator pedal, as actuated by the driver, in a pedal position within the pedal travel interval, to compare the ascertained actual hold time with the limit hold time, and to decrease the resistance force, when the limit hold time is exceeded. The evaluation unit can thus have a comparator module to compare the actual hold time with the limit hold time stored in the control unit. When the actual hold time exceeds the limit hold time, the evaluation unit can generate the deactivation signal to effect a decrease of the resistance force applied by the actuator. Advantageously, the actuator is completely deactivated in the presence of the deactivation signal in order to keep electric power consumption to a minimum.

The present invention is based on the assumption that starting from the predefined limit hold time of the accelerator pedal in its pedal position within the pedal travel interval, this pedal position is maintained so long as the pressure point is not overridden. The actuator can thus be deactivated. Suitably, the limit hold time is in a range of few seconds and can be established empirically. The invention recognizes hereby that the foot position of the driver normally remains unchanged, even when the actuator is deactivated. In other words, a travel in the pedal position selected by the driver is still ensured, when the actuator is deactivated.

As travel continues, the driver is able to again actuate the accelerator pedal with positive gradient, i.e. depress the accelerator pedal further. In this case, the accelerator pedal control is configured such that the actuator is again activated to abruptly re-apply the resistance force. In this way, inadvertent overriding of the pressure point is prevented.

The presence of the pressure point generated by the active accelerator pedal causes a haptic feedback about current travel parameters. The invention is especially suitable for application in a hybrid vehicle in which the drive unit includes an internal combustion engine and at least one electric machine. Such a hybrid vehicle can be powered in a first operating mode solely through operation of the electric machine, when traveling at a lower speed range. In a second operating mode, the vehicle can be operated in addition with the internal combustion engine or exclusively with the internal combustion engine, while the electric machine is switched off. With this energy-saving control strategy, the accelerator pedal may initially be depressed until the pressure point is reached, without overriding the pressure point. In this way, the pedal travel associated with pure electromotive drive can be fully utilized, without the internal combustion engine being added or switched to.

According to another aspect of the present invention, a method includes depressing by a driver an active accelerator pedal to generate a desired torque, transmitting the desired torque to a control unit for operating a drive unit in response to the desired torque, imposing a resistance force on the active accelerator pedal from an actuator operatively connected to the control unit, thereby generating a pressure point for the accelerator pedal, with the resistance force increasing in a locally limited pedal travel interval up to a maximum force which can be overridden by the driver; and generating a deactivation signal within the pedal travel interval, when the accelerator pedal reaches a predefined limit hold time to thereby enable a decrease of the resistance force.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
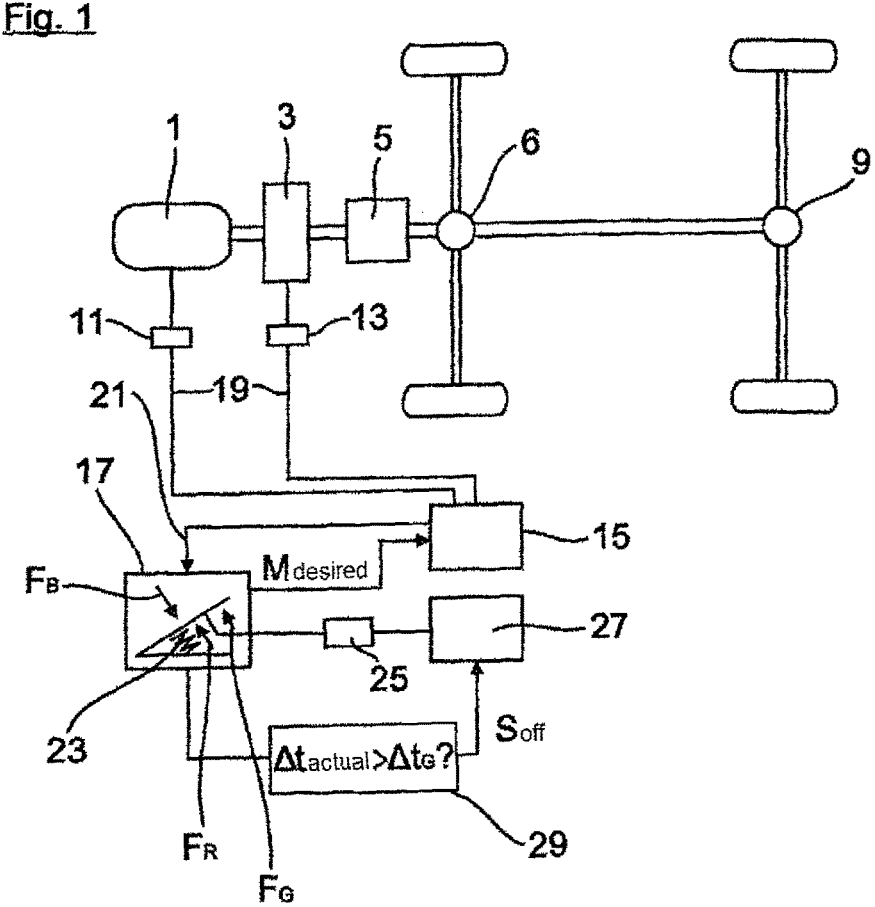
FIG. 1 is a roughly schematic block diagram of a dive train of a motor vehicle with associated control for an active accelerator pedal in accordance with the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a roughly schematic block diagram of a dive train of a motor vehicle with associated control for the drive unit in accordance with the present invention. For ease of understanding of the present invention, the block diagram is only a rough representation and does not reflect an accurate structure of the motor vehicle. The drive unit of the motor vehicle includes an internal combustion engine 1 and an electric machine 3 connected in series in the drive train and coupled in the drive train in driving relation with a transmission 5. The transmission 5 is in driving relation with a front-side axle differential 6 which is in driving relation with a rear axle differential 9. The internal combustion engine 1 and the electric motor 3 can be operated via a motor controller 11 and a power electronics 13 by means of an electronic control device 15 which ascertains a plurality of travel parameters as input variables. Moreover, the control device 15 is linked via signal connection with a gas pedal 17 which is configured as an active accelerator pedal or so-called force-feedback pedal having a characteristic curve (FIG. 2) which is variable in dependence on control signals of the control device 15. For this purpose, the control device 15 is connected with the accelerator pedal 17 via signal line 21. Depending on the angle of displacement (i.e. the pedal travel s) of the active accelerator pedal 17, a driver input, representative of a desired drive torque $M_{desired}$, is fed to the control device 15. The control device 15 controls in response to the desired torque input the engine controller 11 and/or the power electronics 13 via signal lines 19.

Figure 2:
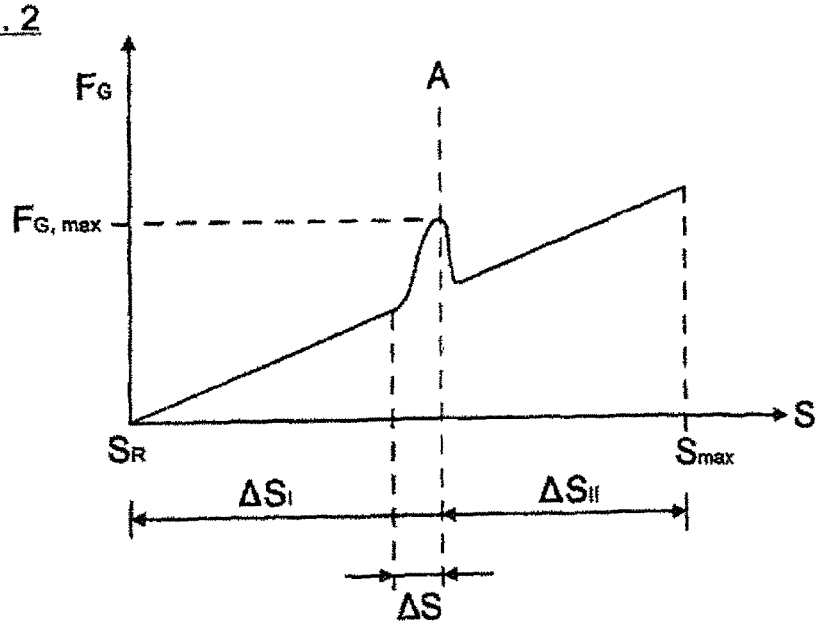
FIG. 2 is an accelerator pedal characteristic curve, showing the relation between pedal position and resistance force.
Figure 3:
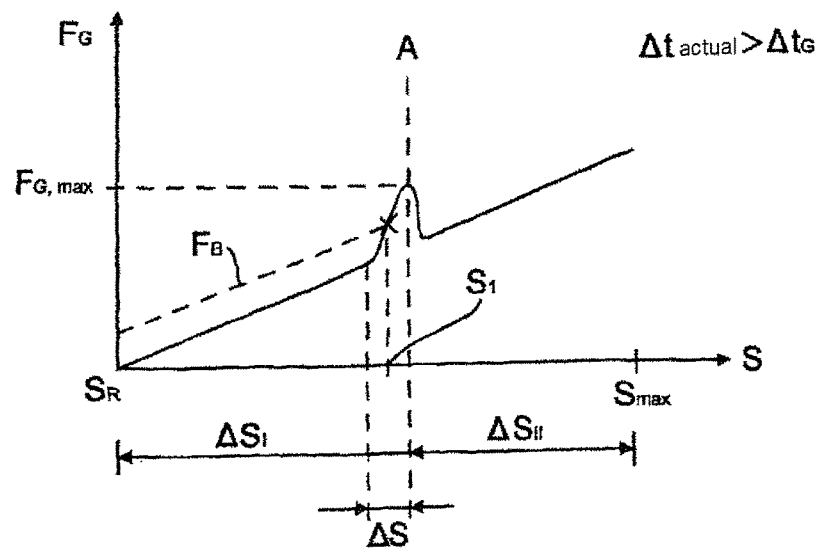
FIGS. 3 and 4 are accelerator pedal characteristic curves corresponding to FIG. 2 to illustrate a control strategy in accordance with the present invention for controlling an actuator of the accelerator pedal.
Figure 4:
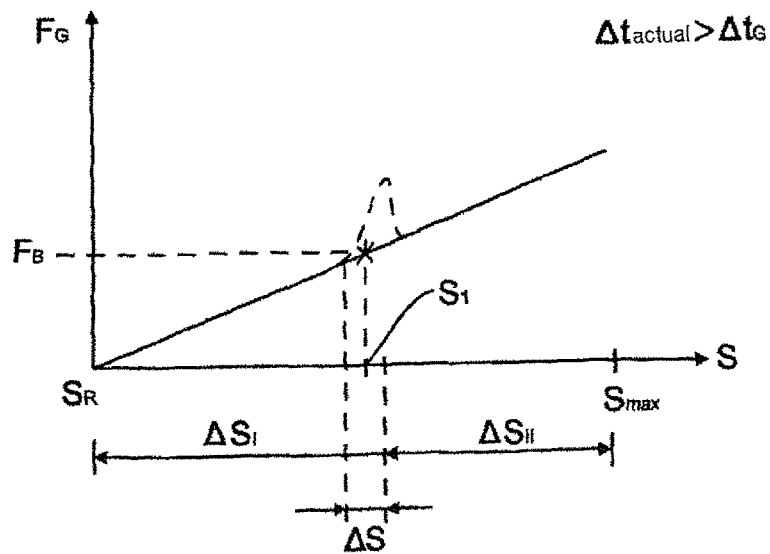

FIG. 1 indicates the accelerator pedal 17 as being adjustable between a rest position $S_R$ and a fully depressed position $S_{max}$ (FIGS. 2 to 4). The accelerator pedal 17 is acted upon by a return spring element 23 with a recoiling force $F_R$ in a direction of the rest position $S_R$. An actuator 25 can apply a resistance force $F_G$ upon the active accelerator pedal 17, thereby generating a pressure point A (FIGS. 2 to 4) in the characteristic curve of the accelerator pedal 17. The pressure point A is generated as the resistance force $F_G$ rises in FIG. 2 in a locally limited pedal travel interval $\Delta S$ up to a maximum force $F_{G, max}$, which can be overridden by the driver's foot, i.e. the driver can still push through.

In the non-limiting embodiment shown here, the accelerator pedal 17 is incorporated, by way of example, in a hybrid vehicle, which may be configured such as to be powered in a first operating mode $\Delta SI$ solely by the electric machine 3, and in a second operating mode $\Delta SII$ solely by the internal combustion engine 1. The pressure point A provides a haptic feedback to the driver to prompt the driver that the hybrid vehicle changes from the first operating mode $\Delta SI$ to the second operating mode $\Delta SII$, when the pressure point A is overridden. The pressure point A can be shifted in dependence on diverse travel parameters, e.g. loading state of a traction battery (not shown), along the pedal characteristic curve between the pedal rest position $S_R$ and the depressed pedal position $S_{max}$.

The actuator 25 can be activated/deactivated by an accelerator pedal control unit 27 which is operatively connected to an evaluation unit 29. the evaluation unit 29 ascertains during travel an actual hold time $\Delta t_{actual}$ in which the driver maintains the accelerator pedal 17 in a pedal position $S_1$ within the pedal travel interval $\Delta S$ (FIG. 3).

The evaluation unit 29 and the control unit 27 operate the actuator 25 of the accelerator pedal 17 with a control strategy that is energy saving and applicable in particular in the following travel situation: The driver intends to power the vehicle solely via the electric machine 1. For this purpose, the driver's foot activates the pressure point A, for example in a position-controlled or force-controlled manner, without exceeding it. This is shown in FIG. 3, depicting an actual pedal position $S_1$ which is chosen by the driver via a force-controlled activation for example, and in which the foot actuation force $F_B$ applied by the driver and the pedal recoiling force $F_R$ and the pedal resistance force $F_G$ are at an equilibrium of forces.

The actual pedal position $S_1$, indicated in FIGS. 3 and 4 by a cross is located directly at the pressure point A, specifically within the afore-defined pedal travel interval $\Delta S$ which is located anteriorly of the pressure point A. The evaluation unit 29 ascertains the actual hold time $\Delta t_{actual}$ of the accelerator pedal 17 in its pedal position $S_1$ in the pedal travel interval $\Delta S$. The evaluation unit 29 compares the ascertained actual hold time $\Delta t_{actual}$ with a limit hold time $\Delta t_G$, stored in the evaluation unit 29. When the actual hold time $\Delta t_{actual}$ exceeds the limit hold time $\Delta t_G$, the evaluation unit 29 recognizes then that the driver intends to retain the pedal position $S_1$ in the pedal travel interval $\Delta S$, without pushing through the pressure point A.

As a result, the evaluation unit 29 generates a deactivation signal $S_{OFF}$. In the presence of the deactivation signal $S_{OFF}$, the control unit 27 deactivates the actuator 25 so that the resistance force $F_G$ defining the pressure point A is removed, as indicated by the diagram of FIG. 4.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A vehicle, comprising:
    a drive unit configured to generate a drive torque in driving relationship to wheels of the vehicle;
    a gas pedal constructed in the form of an active accelerator pedal which is adjustable over a pedal travel;
    a control device configured to activate the drive unit in response to a desired torque given by a driver through actuation of the accelerator pedal, said control device including an evaluation unit; and
    an actuator operatively connected to the control unit and configured to apply a resistance force upon the accelerator pedal, thereby generating a pressure point for the accelerator pedal, with the resistance force increasing in a locally limited pedal travel interval up to a maximum force which can be overridden by the driver,
    said evaluation unit being configured to generate a deactivation signal within the pedal travel interval, when the accelerator pedal reaches a predefined limit hold time to thereby enable a decrease of the resistance force.

2. The vehicle of claim 1, wherein the evaluation unit is configured to ascertain an actual hold time of the accelerator pedal, as actuated by the driver, in a pedal position within the pedal travel interval, to compare the ascertained actual hold time with the limit hold time, and to decrease the resistance force, when the limit hold time is exceeded.

3. The vehicle of claim 1, wherein the actuator is deactivated in the presence of the deactivation signal.

4. The vehicle of claim 1, wherein the evaluation unit is configured to recognize, when the predefined limit hold time is reached, that a pedal position of the accelerator pedal within the pedal travel interval is to be retained, and to deactivate the actuator.

5. The vehicle of claim 1, wherein the presence of the pressure point provides a haptic feedback about a travel mode.

6. The vehicle of claim 5, wherein the drive unit is configured for operation in a first operating mode and a second operating mode, with a change from the first operating mode to the second operating mode being signaled to the driver when overriding the pressure point.

7. The vehicle of claim 6, wherein the drive unit includes an internal combustion engine and at least one electric machine, with the first operating mode being implemented solely through operation of the electric machine, and the second operating mode being implemented through addition of the internal combustion engine or sole operation of the internal combustion engine.

8. The vehicle of claim 1, wherein the actuator is activated to abruptly apply the resistance force in the event the driver again actuates the accelerator pedal during continuous travel with a positive gradient.

9. An active accelerator pedal for a vehicle, said active accelerator pedal being adjustable over a pedal travel and constructed for actuation by a driver to generate a predefined desired torque transmitted to a control unit which actuates a drive unit in response to the defined desired torque, with a resistance force being imposed on the active accelerator pedal from an actuator operatively connected to the control unit to thereby generate a pressure point for the accelerator pedal, with the resistance force increasing in a locally limited pedal travel interval up to a maximum force which can be overridden by the driver, wherein a deactivation signal within the pedal travel interval is generated by an evaluation unit of the control unit, when the accelerator pedal reaches a predefined limit hold time to thereby enable a decrease of the resistance force.

10. A method, comprising:
    depressing by a driver an active accelerator pedal to generate a desired torque;
    transmitting the desired torque to a control unit for operating a drive unit in response to the desired torque;
    imposing a resistance force on the active accelerator pedal from an actuator operatively connected to the control unit, thereby generating a pressure point for the accelerator pedal, with the resistance force increasing in a locally limited pedal travel interval up to a maximum force which can be overridden by the driver; and
    generating a deactivation signal within the pedal travel interval, when the accelerator pedal reaches a predefined limit hold time to thereby enable a decrease of the resistance force.

* * * * *